US011700355B2

(12) United States Patent
Oishi et al.

(10) Patent No.: US 11,700,355 B2
(45) Date of Patent: Jul. 11, 2023

(54) REGION MONITORING SYSTEM AND CONTROL METHOD FOR REGION MONITORING SYSTEM

(71) Applicant: HONDA MOTOR CO., LTD., Tokyo (JP)

(72) Inventors: Yasuo Oishi, Tokyo (JP); Akira Iihoshi, Tokyo (JP); Atsuki Kakinuma, Tokyo (JP); Takeo Tokunaga, Tokyo (JP); Hiroyuki Onimaru, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/698,495

(22) Filed: Mar. 18, 2022

(65) Prior Publication Data

US 2022/0321837 A1 Oct. 6, 2022

(30) Foreign Application Priority Data

Mar. 30, 2021 (JP) ................................ 2021-058537

(51) Int. Cl.
*H04N 13/156* (2018.01)
*H04N 7/18* (2006.01)
*B60R 25/30* (2013.01)

(52) U.S. Cl.
CPC ........... *H04N 7/181* (2013.01); *B60R 25/305* (2013.01); *H04N 13/156* (2018.05)

(58) Field of Classification Search
CPC ...... H04N 7/181; H04N 13/156; B60R 25/305
USPC ........................................................ 348/43
See application file for complete search history.

(56) References Cited

U.S. PATENT DOCUMENTS

| 2016/0091894 | A1  |   | 3/2016 | Zhang et al. |              |
|--------------|-----|---|--------|--------------|--------------|
| 2018/0249131 | A1  | * | 8/2018 | Oami ......................  | G08B 25/10   |
| 2019/0215492 | A1  |   | 7/2019 | Oami et al. |              |
| 2019/0222823 | A1  | * | 7/2019 | Clagg ..................  | H04N 13/344  |

FOREIGN PATENT DOCUMENTS

| JP | 2011-232877 A |   | 11/2011 |             |
|----|---------------|---|---------|-------------|
| JP | 2017-509520 A |   | 4/2017  |             |
| JP | 2018129585    | * | 8/2018  | ............... H04N 7/18 |
| JP | 2018190199    | * | 11/2018 | ............... H04N 7/18 |
| WO | 2017/038449 A1|   | 3/2017  |             |

OTHER PUBLICATIONS

JP2018129585 Machine Translation (Year: 2018).*
JP2018190199 Machine Translation (Year: 2018).*
Japanese Office Action from corresponding application JP 2021-058537, dated Nov. 15, 2022, 9 pages.

* cited by examiner

*Primary Examiner* — Nguyen T Truong
(74) *Attorney, Agent, or Firm* — Rankin, Hill & Clark LLP (57) ABSTRACT

A region monitoring system includes: a first communication control unit that transmits monitoring camera captured-image data to a monitoring server, the monitoring camera captured-image data being captured-image data of a monitoring camera that monitors a region in which a plurality of houses are located; and a camera communication control unit that transmits in-vehicle camera captured-image data to the monitoring server, the in-vehicle camera captured-image data being captured-image data of an in-vehicle camera of a vehicle located in the region.

7 Claims, 7 Drawing Sheets

REGION MONITORING SYSTEM AND CONTROL METHOD FOR REGION MONITORING SYSTEM

INCORPORATION BY REFERENCE

The present application claims priority under 35 U.S.C. § 119 to Japanese Patent Application No. 2021-058537 filed on Mar. 30, 2021. The content of the application is incorporated herein by reference in its entirety.

BACKGROUND OF THE INVENTION

Field of the Invention

The present invention relates to a region monitoring system and a control method for the region monitoring system.

Description of the Related Art

In related art, a monitoring system using a camera is known.

For example, Japanese Patent Laid-Open No. 2011-232877 discloses a security system capable of monitoring the vicinity of a house and the theft of a vehicle by utilizing an in-vehicle camera of a parked vehicle as a part of a monitoring camera of the house.

By the way, according to the monitoring system using the camera as in Japanese Patent Laid-Open No. 2011-232877, there is a demand for monitoring the entire region where a plurality of houses are present. However, when the camera for monitoring is a camera installed fixedly in a house or a parked vehicle as in Japanese Patent Laid-Open No. 2011-232877, a monitoring range is limited and thus there is a problem that the region cannot be appropriately monitored.

The present invention has been made in view of such a circumstance, and an object thereof is to make it possible to appropriately monitor a region using a camera.

SUMMARY OF THE INVENTION

In order to achieve the above object, an aspect of the present invention is a region monitoring system including: a first transmission unit that transmits first captured-image data to a monitoring device, the first captured-image data being captured-image data of a monitoring camera that monitors a region in which a plurality of houses are located; and a second transmission unit that transmits second captured-image data to the monitoring device, the second captured-image data being captured-image data of an in-vehicle camera of a vehicle located in the region.

The region monitoring system may have a configuration in which the region monitoring system further includes an incentive granting unit that grants an incentive according to an operating time of the in-vehicle camera to a driver of the vehicle.

The region monitoring system may have a configuration in which the second transmission unit starts operating a communication device of the vehicle when the second transmission unit transmits the second captured-image data, and transmits the second captured-image data to the monitoring device via the communication device being operated.

The region monitoring system may have a configuration in which the region monitoring system further includes a vehicle, the vehicle including: a transmission/reception unit that transmits and receives the second captured-image data to and from another vehicle which is located in the region; and a communication setting unit that sets the other vehicle as a target for the transmission/reception unit to transmit and receive the second captured-image data.

The region monitoring system may have a configuration in which the vehicle includes an authentication unit that performs authentication based on authentication information transmitted from the other vehicle, and the communication setting unit sets the other vehicle, which transmits the authentication information, as the target when the authentication unit determines authentication success.

The region monitoring system may have a configuration in which when the transmission/reception unit sets, out of a plurality of the other vehicles between which the second captured-image data is capable of being transmitting and receiving, one of the plurality of the other vehicles as the target, the transmission/reception unit receives the second captured-image data from each of the plurality of the other vehicles.

The region monitoring system may have a configuration in which the region monitoring system further includes an image generation unit that generates a three-dimensional stitching image in which a plurality images are stitched, based on a first captured image indicated by the first captured-image data transmitted by the first transmission unit and a second captured image indicated by the second captured-image data transmitted by the second transmission unit.

In order to achieve the above object, another aspect of the present invention is a control method for a region monitoring system, the control method including: a first transmission step of transmitting captured-image data of a monitoring camera that monitors a region, in which a plurality of houses are located, to a monitoring device; and a second transmission step of transmitting captured-image data of an in-vehicle camera of a vehicle to the monitoring device, the vehicle being located in the region.

Advantageous Effect of Invention

According to the aspects of the present invention, there is an effect that the region can be appropriately monitored using the camera.

DETAILED DESCRIPTION OF THE PREFERRED EMBODIMENT

1. Outline of Region Monitoring System

An outline of a region monitoring system 1000 of the present embodiment will be described with reference to FIG. 1.

The region monitoring system 1000 of the present embodiment is a system that uses a monitoring camera 1 installed in a region A and an in-vehicle camera 3 of a vehicle 2 located in the region A to perform monitoring of the region A. In the present embodiment, the monitoring of the region A means capturing an image with the monitoring camera 1 and the in-vehicle camera 3, collecting the captured-image data of the monitoring camera 1, collecting the captured-image data of the in-vehicle camera 3, providing the collected captured-image data to a resident P, and providing processed data of the captured-image data to the resident P. In the present embodiment, a four-wheeled vehicle is exemplified as the vehicle 2, but the vehicle 2 may be a vehicle other than the four-wheeled vehicle.

In the following description, the captured-image data of the monitoring camera 1 is simply referred to as "monitoring camera captured-image data" as necessary. In addition, the captured-image data of the in-vehicle camera 3 is simply referred to as "in-vehicle camera captured-image data" as necessary. The monitoring camera captured-image data corresponds to first captured-image data. The in-vehicle camera captured-image data corresponds to second captured-image data.

Figure 1:
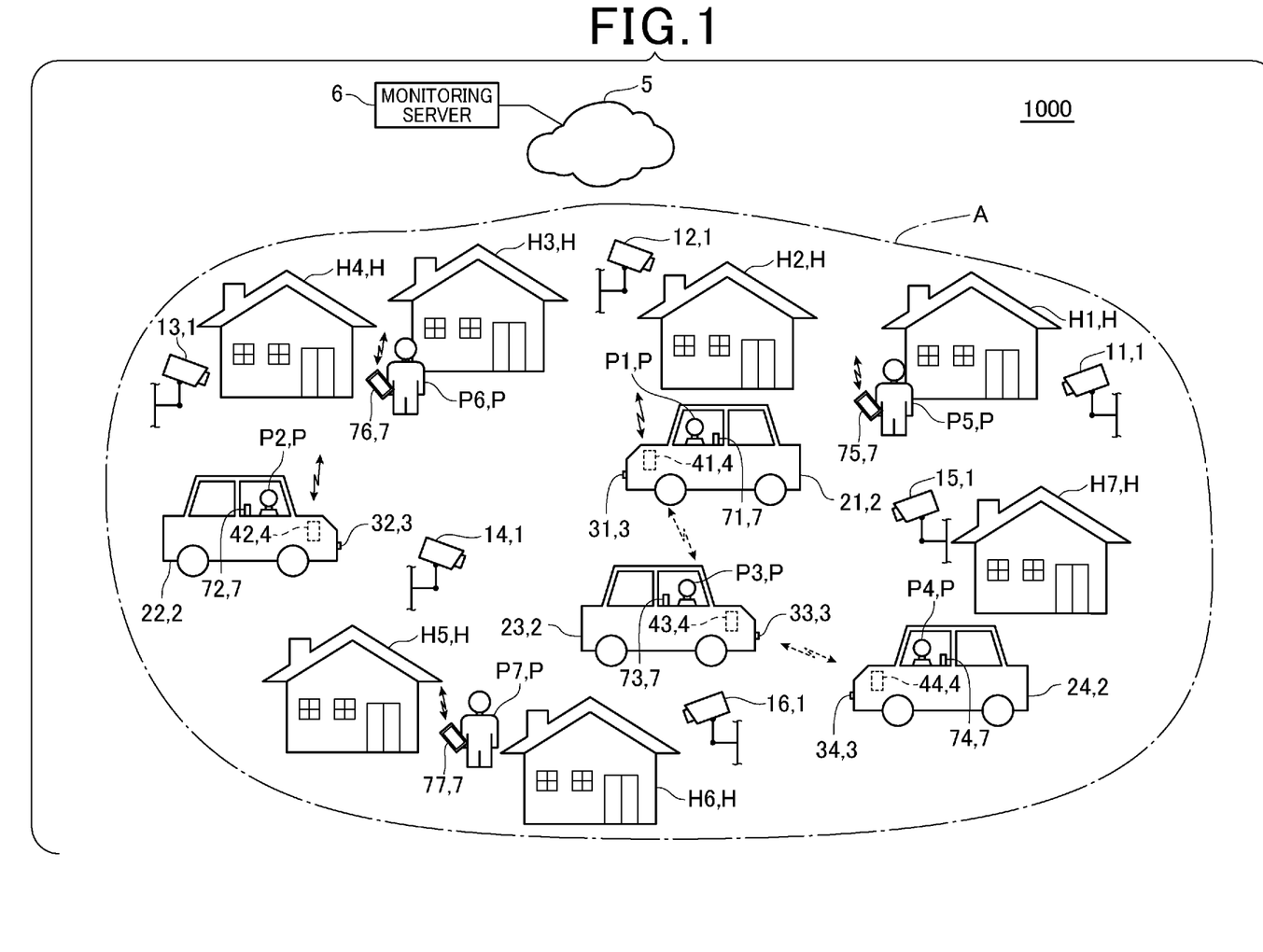
FIG. 1 is an explanatory diagram showing an outline of a region monitoring system.

In the region A of FIG. 1, seven houses, for example, houses H1, H2, H3, H4, H5, H6, and H7 are present. FIG. 1 shows residents P1, P2, P3, P4, P5, P6, and P7 as the resident P in the region A.

In FIG. 1, the resident P1 is driving a vehicle 21. In other words, the resident P1 is a driver of the vehicle 21. The vehicle 21 is owned by the resident P1. The vehicle 21 is capturing a front of the vehicle 21 with the in-vehicle camera 31. The captured-image data of the in-vehicle camera 31 is transmitted to a monitoring server 6 via a communication network 5 by a telematics control unit (TCU) 41 provided in the vehicle 21. The communication network 5 may be a data communication network, and may include a wide area communication network including a public line network and a local area network (LAN) as examples. In the example of FIG. 1, a vehicle 23 is set as a target for the vehicle 21 to transmit the in-vehicle camera captured-image data. Therefore, the captured-image data of the in-vehicle camera 31 is also transmitted to the vehicle 23 by a TCU 41. The resident P1 uses a resident terminal 71. A region monitoring application 711 is installed on the resident terminal 71.

The monitoring server 6 corresponds to a monitoring device.

In FIG. 1, the resident P2 is driving a vehicle 22. In other words, the resident P2 is a driver of the vehicle 22. The vehicle 22 is owned by the resident P2. The vehicle 22 is capturing a front of the vehicle 22 with an in-vehicle camera 32. The captured-image data of the in-vehicle camera 32 is transmitted to the monitoring server 6 via the communication network 5 by a TCU 42 of the vehicle 22. The resident P2 uses a resident terminal 72. The region monitoring application 711 is installed on the resident terminal 72.

In FIG. 1, the resident P3 is driving a vehicle 23. In other words, the resident P3 is a driver of the vehicle 23. The vehicle 23 is owned by the resident P3. The vehicle 23 is capturing a front of the vehicle 23 with an in-vehicle camera 33. In the example of FIG. 1, the monitoring server 6 is not set as a target for the vehicle 23 to transmit the in-vehicle camera captured-image data. On the other hand, in the example of FIG. 1, the vehicle 21 and a vehicle 24 are set as targets for the vehicle 23 to transmit the in-vehicle camera captured-image data. Therefore, the captured-image data of the in-vehicle camera 33 is not transmitted to the monitoring server 6 by a TCU 43, but is transmitted to the vehicle 21 and the vehicle 24. Further, the vehicle 23 transmits the captured-image data of the in-vehicle camera 31 received from the vehicle 21 to the vehicle 24 using the TCU 43. In addition, the vehicle 23 transmits captured-image data of an in-vehicle camera 34 received from the vehicle 24 to the vehicle 21 using the TCU 43. The resident P3 uses a resident terminal 73. The region monitoring application 711 is installed on the resident terminal 73.

In FIG. 1, the resident P4 is driving the vehicle 24. In other words, the resident P4 is a driver of the vehicle 24. The vehicle 24 is owned by the resident P4. The vehicle 24 is capturing a front of the vehicle 24 with the in-vehicle camera 34. In the example of FIG. 1, the monitoring server 6 is not set as a target for the vehicle 24 to transmit the in-vehicle camera captured-image data. On the other hand, in the example of FIG. 1, the vehicle 23 is set as a target for the vehicle 24 to transmit the in-vehicle camera captured-image data. Therefore, the captured-image data of the in-vehicle camera 34 is transmitted to the vehicle 23 by a TCU 44. The resident P4 uses a resident terminal 74. The region monitoring application 711 is installed on the resident terminal 74.

In FIG. 1, the residents P5, P6, and P7 are not driving the vehicle 2. The residents P5, P6, and P7 use resident terminals 75, 76, and 77, respectively. The region monitoring application 711 is installed on each of the resident terminals 75, 76, and 77.

In the region A of FIG. 1, six monitoring cameras 1, for example, monitoring cameras 11, 12, 13, 14, 15, and 16 are installed. Each of the monitoring cameras 11, 12, 13, 14, 15, and 16 communicates with the monitoring server 6 via the communication network 5. Each of the monitoring cameras 11, 12, 13, 14, 15, and 16 transmits the monitoring camera captured-image data to the monitoring server 6.

The monitoring server 6 is a server device that monitors the region A. The monitoring server 6 performs processing related to the monitoring of the region A. The processing related to the monitoring of the region A includes collection of the monitoring camera captured-image data, collection of the in-vehicle camera captured-image data, generation of a three-dimensional stitching image, and provision of at least any one of the monitoring camera captured-image data, the in-vehicle camera captured-image data, and image data of the stitching image. The monitoring server 6 communicates with the monitoring camera 1, the vehicle 2, and the resident terminal 7 via the communication network 5. The monitoring server 6 is represented by one block, but this does not necessarily mean that the monitoring server 6 is configured by a single server device. For example, the monitoring server 6 may include a plurality of server devices having different processing contents.

2. Configuration of Region Monitoring System

Figure 2:
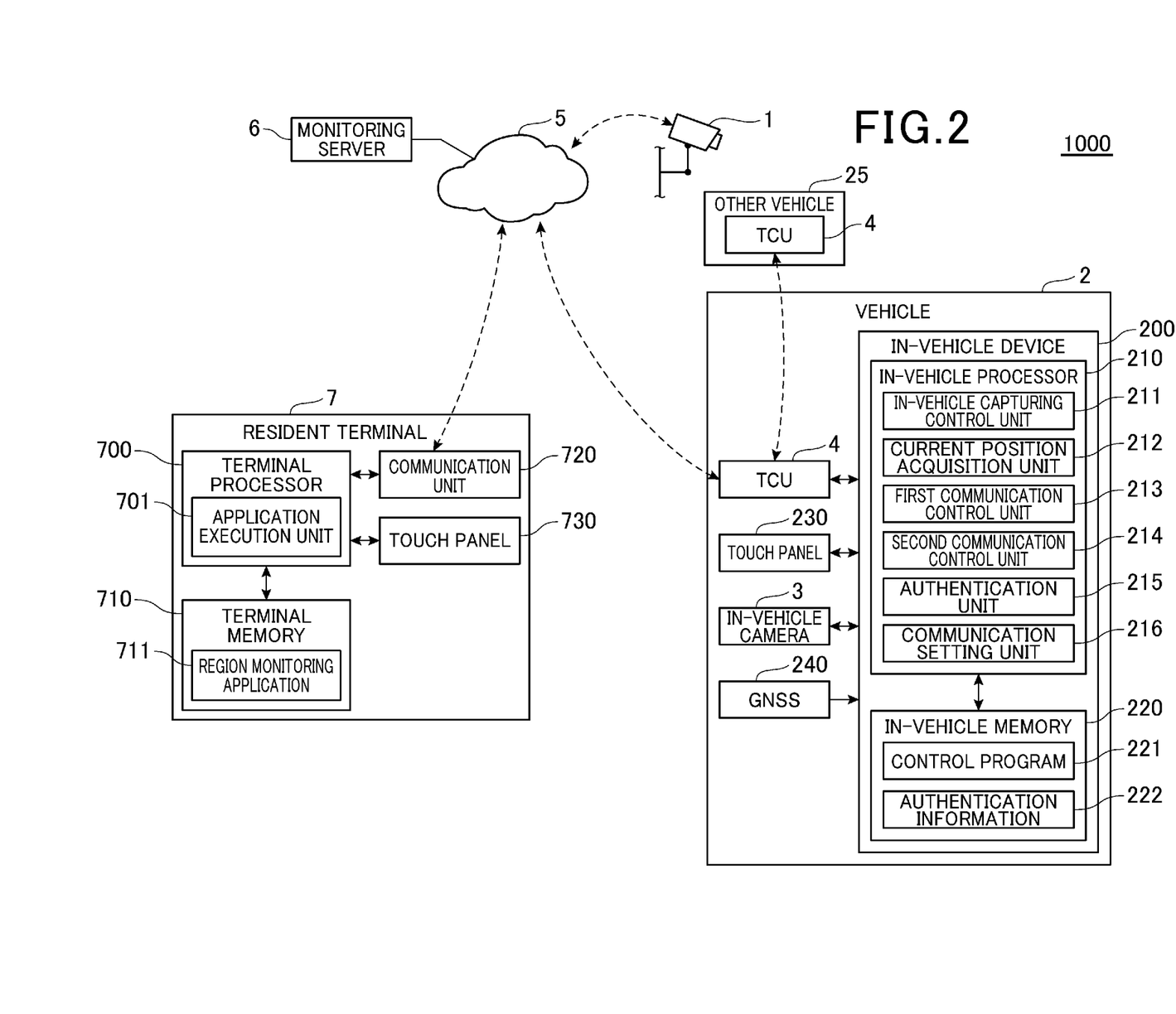
FIG. 2 is a diagram showing a configuration of the region monitoring system.

FIG. 2 is a diagram showing a configuration of the region monitoring system 1000.

The region monitoring system 1000 includes a vehicle 2.

The vehicle 2 includes an in-vehicle device 200, a TCU 4, a touch panel 230, an in-vehicle camera 3, and a global navigation satellite system (GNSS) 240.

The TCU 4 corresponds to an example of a communication device.

The in-vehicle device 200 is a device mounted on the vehicle 2. The in-vehicle device 200 is a device including the touch panel 230 provided in the vehicle 2, and a device called a display audio (DA) or a car navigation device, for example.

As shown in FIG. 2, the in-vehicle device 200 includes an in-vehicle processor 210 which is a processor such as a central processing unit (CPU) or a micro-processing unit (MPC), and an in-vehicle memory 220 which is a memory for storing programs and data.

The in-vehicle processor 210 reads a control program 221 stored in the in-vehicle memory 220 and executes the control program, thereby functioning as an in-vehicle capturing control unit 211, a current position acquisition unit 212, a first communication control unit 213, a second communication control unit 214, an authentication unit 215, and a communication setting unit 216.

The first communication control unit 213 corresponds to a second transmission unit. The second communication control unit 214 corresponds to a transmission/reception unit.

The in-vehicle memory 220 stores a program to be executed by the in-vehicle processor 210 and data to be processed by the in-vehicle processor 210. The in-vehicle memory 220 stores the control program 221 to be executed by the in-vehicle processor 210 and various other data. The in-vehicle memory 220 includes a non-volatile storage area. Further, the in-vehicle memory 220 may include a volatile storage area and form a work area of the in-vehicle processor 210.

The TCU 4, the touch panel 230, the in-vehicle camera 3, and the GNSS 240 are connected to the in-vehicle device 200. Other devices such as a vehicle speed sensor may be connected to the in-vehicle device 200 without being limited to the above-described devices.

The touch panel 230 has a configuration in which a liquid crystal panel for displaying characters and images and a touch sensor for detecting contact with the liquid crystal panel are superimposed, and is installed on a dashboard of the vehicle 2, for example.

The in-vehicle camera 3 is a camera provided in the vehicle 2. The in-vehicle camera 3 of the present embodiment is a front camera that captures the front of the vehicle 2. The in-vehicle camera 3 is not limited to the front camera, and may include at least one of a right side camera that captures a right side of the vehicle 2, a left side camera that captures a left side of the vehicle 2, and a rear camera that captures a rear side of the vehicle 2.

The GNSS 240 measures a current position of the vehicle 2. When the vehicle 2 is mounted with a car navigation system (not shown), a global positioning system (GPS) unit included a car navigation device as the GNSS 240 may be used.

As described above, the in-vehicle processor 210 functions as the in-vehicle capturing control unit 211, the current position acquisition unit 212, the first communication control unit 213, the second communication control unit 214, the authentication unit 215, and the communication setting unit 216.

The in-vehicle capturing control unit 211 controls the start and end of a capturing operation of the in-vehicle camera 3. The in-vehicle capturing control unit 211 acquires in-vehicle camera captured-image data from the in-vehicle camera 3. The in-vehicle capturing control unit 211 outputs the in-vehicle camera captured-image data to the first communication control unit 213 and the second communication control unit 214. The in-vehicle capturing control unit 211 measures an operating time from the start to the end of the operating of the in-vehicle camera 3. The in-vehicle capturing control unit 211 outputs operating time information indicating the measured operating time to the first communication control unit 213.

The current position acquisition unit 212 acquires position information indicating the current position of the vehicle 2 from the GNSS 240, thereby acquiring the current position of the vehicle 2. The current position acquisition unit 212 acquires position information indicating the current position of the vehicle 2 when the in-vehicle camera 3 is capturing. The current position acquisition unit 212 outputs the acquired position information of the vehicle 2 to the first communication control unit 213.

The monitoring server 6 is set as a communication target of the TCU 4, in other words, when the vehicle 2 and the monitoring server 6 can communicate with each other, the first communication control unit 213 communicates with the monitoring server 6 via the TCU 4. The first communication control unit 213 transmits the in-vehicle camera captured-image data, which is output by the in-vehicle capturing control unit 211, to the monitoring server 6 in association with the position information acquired by the current position acquisition unit 212.

The second communication control unit 214 communication with the other vehicle 25 via the TCU 4. For example, when the vehicle 2 in FIG. 2 is the vehicle 21 in FIG. 1, the other vehicle 25 is at least one of the vehicles 22, 23, and 24. When the other vehicle 25 is set as a target for the vehicle 2 to transmit and receive the in-vehicle camera captured-image data, the second communication control unit 214 transmits the in-vehicle camera captured-image data output from the in-vehicle capturing control unit 211 to the set other vehicle 25. Further, when the other vehicle 25 is set as a target for the vehicle 2 to transmit and receive the in-vehicle camera captured-image data, the second communication control unit 214 receives the in-vehicle camera captured-image data from the set other vehicle 25.

The authentication unit 215 performs authentication for whether the other vehicle 25 is allowed as the target for transmission and reception of the in-vehicle camera captured-image data. The second communication control unit 214 receives authentication information 222 for performing authentication from the other vehicle 25. The authentication unit 215 determines authentication success when the received authentication information 222 matches the authentication information 222 stored in the in-vehicle memory 220, and determines authentication failure when not matching. The authentication unit 215 outputs the authentication result to the communication setting unit 216.

The communication setting unit 216 sets a target for transmission and reception of the in-vehicle camera captured-image data. The communication setting unit 216 sets the monitoring server 6 as a target for transmission of the in-vehicle camera captured-image data. When the communication setting unit 216 sets the monitoring server 6 as the target, the first communication control unit 213 can communicate with the monitoring server 6, and can transmit the in-vehicle camera captured-image data to the monitoring server 6. When the authentication result of the authentication unit 215 indicates the authentication success, the communication setting unit 216 sets the other vehicle 25, which has transmitted the authentication information 222, as the target for transmission and reception of the in-vehicle camera captured-image data. With such setting, in-vehicle camera communication data can be transmitted and received between the vehicle 2 and the other vehicle 25 which has transmitted the authentication information 222.

As shown in FIG. 2, the region monitoring system 1000 includes a resident terminal 7.

The resident terminal 7 is a mobile device or a portable computer called a handheld computer, for example, a smartphone.

The resident terminal 7 includes a terminal processor 700 that is a processor such as a CPU or an MPC, a terminal memory 710, a communication unit 720, and a touch panel 730.

The terminal processor 700 functions as an application execution unit 701 by reading and executing the region monitoring application 711 stored in the terminal memory 710.

The terminal memory 710 is a memory for storing programs and data. The terminal memory 710 stores a program to be executed by the terminal processor 700 and data to be processed by the terminal processor 700. The terminal memory 710 stores the region monitoring application 711 to be executed by the terminal processor 700 and various other data. The terminal memory 710 includes a non-volatile storage area. Further, the terminal memory 710 may include a volatile storage area and form a work area of the terminal processor 700.

The communication unit 720 (transceiver and receiver) includes a wireless communication device including an antenna, an RF circuit, an encoder, and a decoder. The communication unit 720 communicates with the monitoring server 6 via the communication network 5.

The touch panel 730 has a configuration in which a liquid crystal panel for displaying characters and images and a touch sensor for detecting contact with the liquid crystal panel are superimposed.

The application execution unit 701 communicates with the monitoring server 6 via the communication unit 720. The application execution unit 701 receives various data from the monitoring server 6, and displays an image with the touch panel 230 based on the received data.

Figure 3:
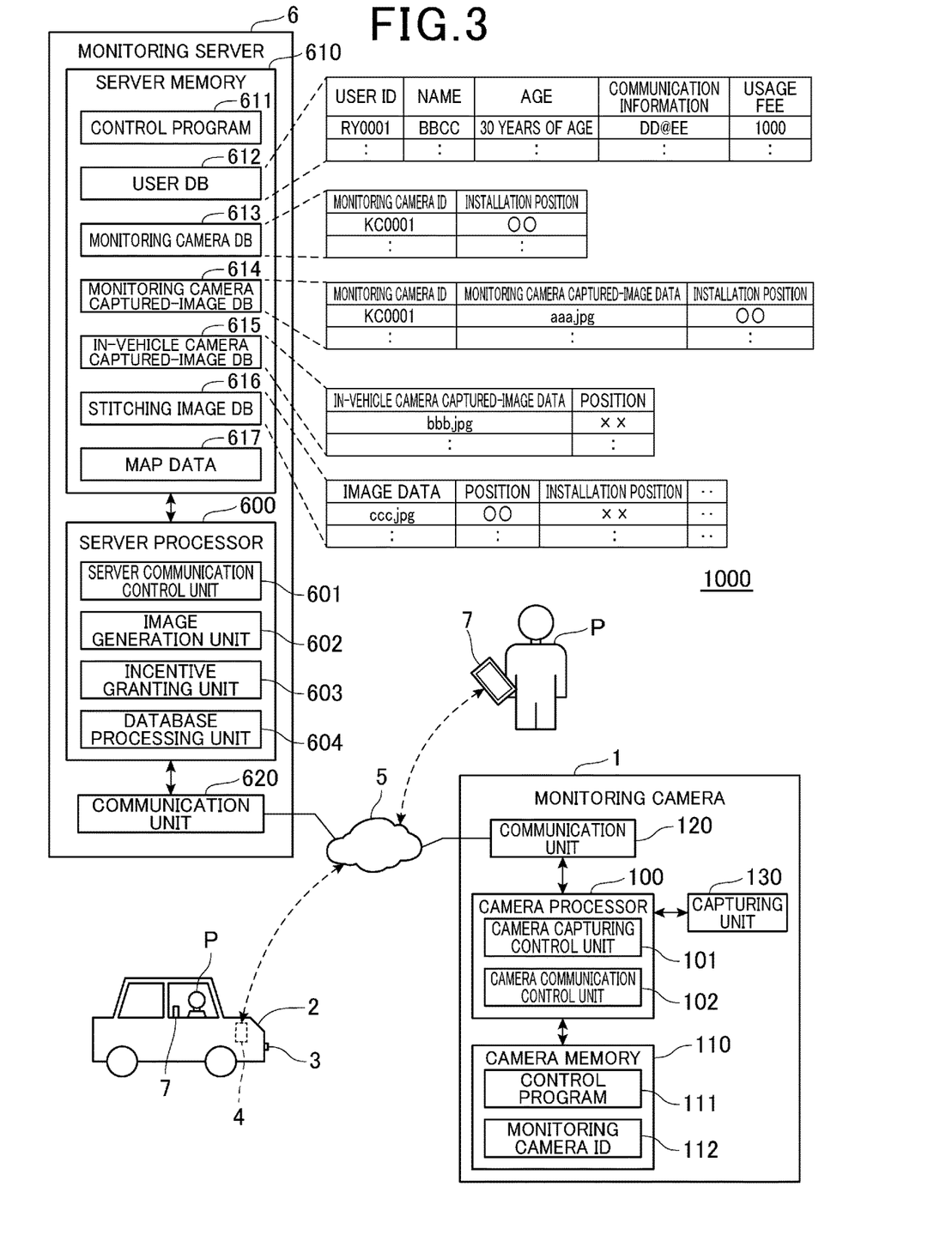
FIG. 3 is a diagram showing a configuration of the region monitoring system.

FIG. 3 is a diagram showing a configuration of the region monitoring system 1000.

The region monitoring system 1000 includes the monitoring camera 1.

The monitoring camera 1 includes a camera processor 100 that is a processor such as a CPU or an MPC, a camera memory 110, a communication unit 120 (transceiver and receiver), and a capturing unit 130 (camera).

The camera processor 100 functions as a camera capturing control unit 101 and a camera communication control unit 102 by reading and executing a control program 111 stored in the camera memory 110.

The camera communication control unit 102 corresponds to an example of a first transmission unit.

The camera memory 110 is stores a program to be executed by the camera processor 100 and data to be processed by the camera processor 100. The camera memory 110 stores the control program 111 to be executed by the camera processor 100 and various other data. The camera memory 110 includes a non-volatile storage area. Further, the camera memory 110 may include a volatile storage area and form a work area of the camera processor 100.

The communication unit 120 includes a wireless communication device including an antenna, an RF circuit, an encoder, and a decoder. The communication unit 120 communicates with the monitoring server 6 via the communication network 5.

The capturing unit 130 includes a lens and an image sensor such as a charge coupled device (CCD) and a C-MOS (Complementary MOS), generates image data for an image of an object, and outputs the image data to the camera processor 100.

As described above, the camera processor 100 functions as the camera capturing control unit 101 and the camera communication control unit 102.

The camera capturing control unit 101 acquires the image data, which is output by the capturing unit 130, as monitoring camera captured-image data. The camera capturing control unit 101 outputs the acquired monitoring camera captured-image data to the camera communication control unit 102.

The camera communication control unit 102 communicates with the monitoring server 6 via the communication unit 120. The camera communication control unit 102 transmits the monitoring camera captured-image data output by the camera capturing control unit 101 to the monitoring server 6 in association with the monitoring camera ID (Identification) 112 stored in the camera memory 110.

The region monitoring system 1000 includes the monitoring server 6.

The monitoring server 6 includes a server processor 600 that is a processor such as a CPU or an MPC, a server memory 610 that is a memory for storing programs and data, and a communication unit 620 (transceiver and receiver).

The server processor 600 functions as a server communication control unit 601, an image generation unit 602, an incentive granting unit 603, and a database processing unit 604 by reading and executing a control program 611 stored in the server memory 610.

The server memory 610 stores a program to be executed by the server processor 600 and data to be processed by the server processor 600. The server memory 610 stores the control program 611 which are executed by the server processor 600, a user DB (database) 612, a monitoring camera DB 613, a monitoring camera captured-image DB 614, an in-vehicle camera captured-image DB 615, a stitching image DB 616, map data 617, and various other data. The server memory 610 includes a non-volatile storage area. Further, the server memory 610 may include a volatile storage area and form a work area of the server processor 600.

In the user DB 612, user's information is recorded for each resident P who is a user of the region monitoring application 711. Such user's information includes a user ID that identifies the user, information on a user's name, information on a user's age, communication information for communicating with the resident terminal 7, and information on a usage fee of the region monitoring application 711.

Information on the monitoring camera 1 is recorded in the monitoring camera DB 613 for each monitoring camera 1. The information on the monitoring camera 1 includes a monitoring camera ID 112 and information on the installation position of the monitoring camera 1.

Information on the monitoring camera captured-image, which is the captured image obtained by the monitoring camera 1, is recorded in the monitoring camera captured-image DB 614. The information on the monitoring camera captured-image includes the monitoring camera captured-image data, the monitoring camera ID 112 of the monitoring camera 1 that has transmitted the monitoring camera captured-image data, and the information on the installation position of the monitoring camera 1.

The monitoring camera captured-image corresponds to a first captured image.

Information on the in-vehicle camera captured-image, which is the captured image obtained by the in-vehicle camera 3, is recorded in the in-vehicle camera captured-image DB 615. The information on the in-vehicle camera captured-image includes the in-vehicle camera captured-image data and the position information of the vehicle 2 when the in-vehicle camera captured-image data is obtained.

The in-vehicle camera captured-image corresponds to a second captured image.

Image data of a three-dimensional stitching image is recorded in the stitching image DB 616. One image data recorded in the stitching image DB 616 is associated with plurality of position information associated with the monitoring camera captured-image data and the in-vehicle camera captured-image data used at the time of generation of the stitching image. The stitching image will be described below.

The map data 617 is data for storing road map information, facility information on various facilities, and map matching data. The road map information consists of a road network in which roads on a map are represented by lines, and includes information on links which are divided into a plurality of sections using intersections and branch points as nodes and defines the sections between the nodes as links. The facility information indicates the position (latitude, longitude) of the facility and the name of the facility.

The communication unit 620 includes a wireless communication device including an antenna, an RF circuit, an encoder, and a decoder. The communication unit 620 communicates with the monitoring camera 1, the vehicle 2, and the resident terminal 7 via the communication network 5.

As described above, the server processor 600 functions as the server communication control unit 601, the image generation unit 602, the incentive granting unit 603, and the database processing unit 604.

The server communication control unit 601 communicates with the monitoring camera 1, the vehicle 2, and the resident terminal 7 via the communication unit 620. Upon receiving the monitoring camera captured-image data from the monitoring camera 1, the server communication control unit 601 outputs the received monitoring camera captured-image data to the database processing unit 604. Upon receiving the in-vehicle camera captured-image data from the vehicle 2, the server communication control unit 601 outputs the received in-vehicle camera captured-image data to the database processing unit 604. Upon receiving the operating time information from the vehicle 2, the server communication control unit 601 outputs the received operating time information to the incentive granting unit 603.

The image generation unit 602 performs a stitching process to generate a stitching image. The stitching process is a process of stitching a plurality of images to generate one image, and includes, for example, a process of specifying a common image in the plurality of images and stitching the specified image as a reference. The stitching image is an image generated by the stitching process. The image generation unit 602 of the present embodiment performs a stitching process to generate a three-dimensional stitching image. The image generation unit 602 refers to the monitoring camera captured-image DB 614 and the in-vehicle camera captured-image DB 615, and extracts the in-vehicle camera captured-images and the monitoring camera captured-images in the plural form (for example, six or more). At the time of extraction, the image generation unit 602 acquires the captured-image data, in which the positions indicated by the position information are close to each other (for example, a separation distance is within one meter), from the monitoring camera captured-image DB 614 and the in-vehicle camera captured-image DB 615. Then, the image generation unit 602 generates a three-dimensional stitching image based on the extracted in-vehicle camera captured-image and monitoring camera captured-image. The image generation unit 602 outputs image data of the generated stitching image to the database processing unit 604. Such image data is associated with the position information associated with the captured-image data used at the time of generation of the stitching image by the image generation unit 602.

The incentive granting unit 603 grants an incentive to the resident P who has captured images by the in-vehicle camera 3. In the present embodiment, the incentive granting unit 603 grants an incentive to the resident P by reducing the operating time fee, which is a fee depending on the operating time of the in-vehicle camera 3, from the usage fee. The incentive granted by the incentive granting unit 603 is not limited to the fee, and may be granted in a manner of providing an article.

The database processing unit 604 performs a process of information recording on various databases.

The database processing unit 604 records the monitoring camera captured-image data, which is output by the server communication control unit 601, in the monitoring camera captured-image DB 614. Further, the database processing unit 604 records the in-vehicle camera captured-image data, which is output by the server communication control unit 601, in the in-vehicle camera captured-image DB 615. In addition, the database processing unit 604 records the image data of the stitching image, which is output by the image generation unit 602, in the stitching image DB 616.

3. Operation of Region Monitoring System

Next, a plurality of operations of the region monitoring system 1000 will be described.

First, a description will be given with respect to the operation of the region monitoring system 1000 when each of the monitoring camera 1 and the vehicle 2 transmits the captured-image data to the monitoring server 6.

Figure 4:
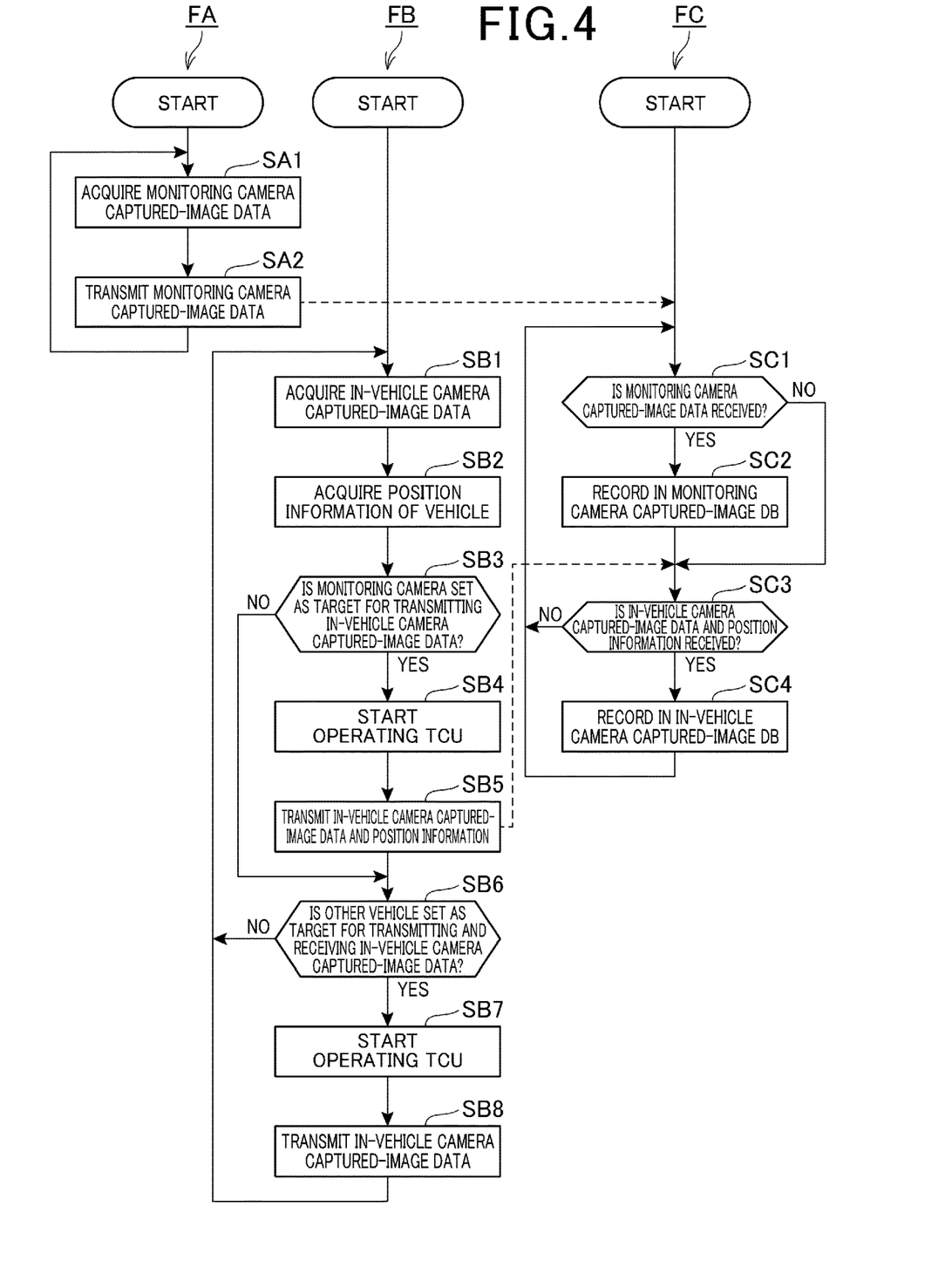
FIG. 4 is a flowchart showing an operation of the region monitoring system.

FIG. 4 is a flowchart showing the operation of the region monitoring system 1000. In FIG. 4, a flowchart FA shows the operation of the monitoring camera 1, a flowchart FB shows the operation of the vehicle 2, and a flowchart FC shows the operation of the monitoring server 6. At the time of start of the flowchart FB, the TCU 4 does not start to operate.

As shown in the flowchart FA, the camera capturing control unit 101 of the monitoring camera 1 acquires monitoring camera captured-image data from the capturing unit 130 (step SA1).

Next, the camera communication control unit 102 transmits the monitoring camera captured-image data, which is acquired in step SA1, to the monitoring server 6 (step SA2). The monitoring camera captured-image data transmitted in step SA2 is associated with the monitoring camera ID 112 stored in the camera memory 110. Step SA2 corresponds to an example of a first transmission step.

As shown in the flowchart FB, the in-vehicle capturing control unit 211 of the vehicle 2 acquires in-vehicle camera captured-image data from the in-vehicle camera 3 (step SB1).

Next, the current position acquisition unit 212 acquires position information of the vehicle 2 from the GNSS 240 when the in-vehicle camera 3 captures (step SB2).

Next, the first communication control unit 213 determines whether the monitoring server 6 is set as a target for transmitting and receiving the in-vehicle camera captured-image data (step SB3).

When the first communication control unit 213 determines that the monitoring server 6 is not set as the target for transmitting and receiving the in-vehicle camera captured-image data (NO in step SB3), the process proceeds to step SB6.

On the other hand, when the first communication control unit 213 determines that the monitoring server 6 is set as the target for transmitting and receiving the in-vehicle camera captured-image data (YES in step SB3), the first communication control unit 213 allows the TCU 4 to start operating (step SB4).

Next, the first communication control unit 213 transmits the in-vehicle camera captured-image data acquired in step SB1 and the position information of the vehicle 2 acquired in step SB2 to the monitoring server 6 in association with each other (step SB5). Step SB5 corresponds to an example of a second transmission step.

Next, the second communication control unit 214 determines whether the other vehicle 25 is set as a target for transmitting and receiving the in-vehicle camera captured-image data (step SB6).

When the second communication control unit 214 determines that the other vehicle 25 is not set as the target for transmitting and receiving the in-vehicle camera captured-image data (NO in step SB6), the process returns to step SB1.

On the other hand, when the second communication control unit 214 determines that the other vehicle 25 is set as the target for transmitting and receiving the in-vehicle camera captured-image data (YES in step SB6), the second communication control unit 214 allows the TCU 4 to start operating (step SB7). In the case of the affirmative determination in step SB6 after step SB4, the second communication control unit 214 may skip step SB7.

Next, the second communication control unit 214 transmits the in-vehicle camera captured-image data, which is acquired in step SB1, to the other vehicle 25 (step SB8).

In the case of the example of FIG. 1, the first communication control unit 213 of the vehicle 21 transmits the captured-image data of the in-vehicle camera 31 to the monitoring server 6. Further, the second communication control unit 214 of the vehicle 21 transmits the captured-image data of the in-vehicle camera 31 to the vehicle 23.

In the case of the example of FIG. 1, the first communication control unit 213 of the vehicle 22 transmits the captured-image data of the in-vehicle camera 32 to the monitoring server 6. On the other hand, the second communication control unit 214 of the vehicle 22 does not transmit the captured-image data of the in-vehicle camera 32 to the other vehicle 25.

In the case of the example of FIG. 1, the first communication control unit 213 of the vehicle 23 does not transmit the captured-image data of the in-vehicle camera 33 to the monitoring server 6. On the other hand, the second communication control unit 214 of the vehicle 23 transmits the captured-image data of the in-vehicle camera 33 to the vehicle 21 and vehicle 24. In addition, the second communication control unit 214 of the vehicle 23 transmits the in-vehicle camera captured-image data, which is transmitted from the vehicle 21, to the vehicle 24. Further, the second communication control unit 214 of the vehicle 23 transmits the in-vehicle camera captured-image data, which is transmitted from the vehicle 24, to the vehicle 21.

In the case of the example of FIG. 1, the first communication control unit 213 of the vehicle 24 does not transmit the captured-image data of the in-vehicle camera 34 to the monitoring server 6. On the other hand, the second communication control unit 214 of the vehicle 24 transmits the captured-image data of the in-vehicle camera 34 to the vehicle 23.

As shown in the flowchart FC, the server communication control unit 601 of the monitoring server 6 determines whether the monitoring camera captured-image data has been received from the monitoring camera 1 (step SC1).

When the server communication control unit 601 determines that the monitoring camera captured-image data has not been received from the monitoring camera 1 (NO in step SC1), the process proceeds to step SC3.

On the other hand, when the server communication control unit 601 determines that the monitoring camera captured-image data has been received from the monitoring camera 1 (YES in step SC1), the database processing unit 604 records the received monitoring camera captured-image data in the monitoring camera captured-image DB 614 (step SC2).

Step SC2 will be described.

The server communication control unit 601 specifies the monitoring camera ID 112 that matches the monitoring camera ID 112 associated with the received monitoring camera captured-image data, from the monitoring camera DB 613. The server communication control unit 601 acquires information on the installation position of the monitoring camera 1 associated with the specified monitoring camera ID 112, from the monitoring camera DB 613. Next, the server communication control unit 601 records the received monitoring camera captured-image data, the monitoring camera ID 112 associated with the monitoring camera captured-image data, and the acquired information on the installation position of the monitoring camera 1 in the monitoring camera captured-image DB 614 in association with one another.

In the case of the example of FIG. 1, the server communication control unit 601 receives monitoring camera captured-image data from each of the monitoring cameras 11, 12, 13, 14, 15, and 16. Then, in the case of the example of FIG. 1, when the database processing unit 604 receives the monitoring camera captured-image data from the monitoring camera 11, the database processing unit 604 records the monitoring camera ID 112 of the monitoring camera 11, the information on the installation position of the monitoring camera 11, and the monitoring camera captured-image data received from the monitoring camera 11 in the monitoring camera captured-image DB 614 in association with one another. Regarding the monitoring cameras 12, 13, 14, 15, and 16, the database processing unit 604 also records in the manner described above.

The server communication control unit 601 determines whether the in-vehicle camera captured-image data has been received from the vehicle 2 (step SC3).

When the server communication control unit 601 determines that the in-vehicle camera captured-image data has not been received from the vehicle 2 (NO in step SC3), the process returns to step SC1.

On the other hand, when the server communication control unit 601 determines that the in-vehicle camera captured-image data has been received from the vehicle 2 (YES in step SC3), the database processing unit 604 records the received in-vehicle camera captured-image data in the in-vehicle camera captured-image DB 615 in a state where the position information of the vehicle 2 is associated (step SC4).

In the case of the example of FIG. 1, the server communication control unit 601 receives the in-vehicle camera captured-image data from each of the vehicles 21 and 22.

Then, in the case of the example of FIG. 1, the database processing unit 604 records the in-vehicle camera captured-image data received from the vehicle 21 in the in-vehicle camera captured-image DB 615 in a state where the position information of the vehicle 21 is associated. Further, the database processing unit 604 records the in-vehicle camera captured-image data received from the vehicle 22 in the in-vehicle camera captured-image DB 615 in a state where the position information of the vehicle 22 is associated.

The in-vehicle camera captured-image data can be transmitted to the other vehicle 25 by authentication by the authentication unit 215.

Next, a description will be given with respect to an operation of the region monitoring system 1000 at the time of authentication of the authentication unit 215.

Figure 5:
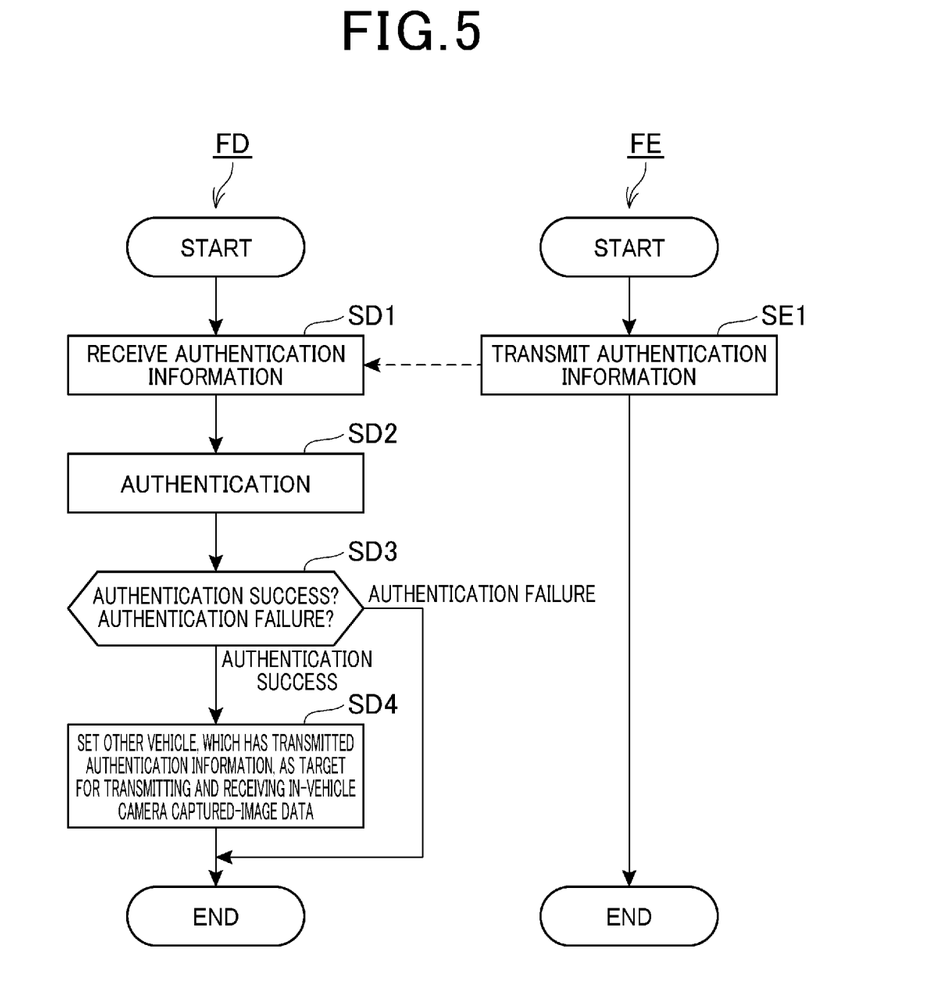
FIG. 5 is a flowchart showing an operation of the region monitoring system.

FIG. 5 is a flowchart showing an operation of the region monitoring system 1000. In FIG. 5, a flowchart FD shows an operation of the vehicle 2, and a flowchart FE shows an operation of the other vehicle 25. The other vehicle 25, which is a main operating body of the flowchart FE, differs from the vehicle 2 which is a main operating body of the flowchart FD.

As shown in the flowchart FE, the second communication control unit 214 of the other vehicle 25 transmits the authentication information 222 to the vehicle 2 (step SE1). The in-vehicle device 200 of the other vehicle 25 acquires authentication information 222 in advance by input of the resident P, for example.

As shown in the flowchart FDB, the second communication control unit 214 of the vehicle 2 receives the authentication information 222 from the other vehicle 25 (step SD1).

Next, the authentication unit 215 performs authentication based on the authentication information 222 received in step SD1 (step SD2). In step SD2, the authentication unit 215 determines authentication success when the authentication information 222 received in step SD1 matches the authentication information 222 stored in the in-vehicle memory 220, and determines authentication failure when not matching each other.

Next, the communication setting unit 216 determines whether authentication success or authentication failure occurs (step SD3).

When the communication setting unit 216 determines authentication failure (authentication failure in step SD3), the process ends.

On the other hand, when the communication setting unit 216 determines authentication success (authentication success in step SD3), the communication setting unit 216 sets the other vehicle 25, which has transmitted the authentication information 222, as a target for the vehicle 2 to transmit and receive the in-vehicle camera captured-image data (step SD4).

For example, in the case of the example of FIG. 1, the vehicle 24 transmits the authentication information 222 to the vehicle 23. The authentication unit 215 of the vehicle 23 performs authentication based on the authentication information 222 received from the vehicle 24, and determines authentication success. Then, the communication setting unit 216 of the vehicle 23 sets the vehicle 24 as a target for transmitting and receiving the in-vehicle camera captured-image data. Thereby, the second communication control unit 214 of the vehicle 24 can receive the in-vehicle camera captured-image data of the in-vehicle camera 33 from the vehicle 23. The vehicle 21 is set as a target for the vehicle 23 to transmit and receive the in-vehicle camera captured-image data. Therefore, the second communication control unit 214 of the vehicle 24 can receive the in-vehicle camera captured-image data of the in-vehicle camera 31 from the vehicle 21 via the vehicle 23.

Next, a description will be given with respect to an operation of the region monitoring system 1000 when an incentive is granted to the resident P who performs capturing with the in-vehicle camera 3.

Figure 6:
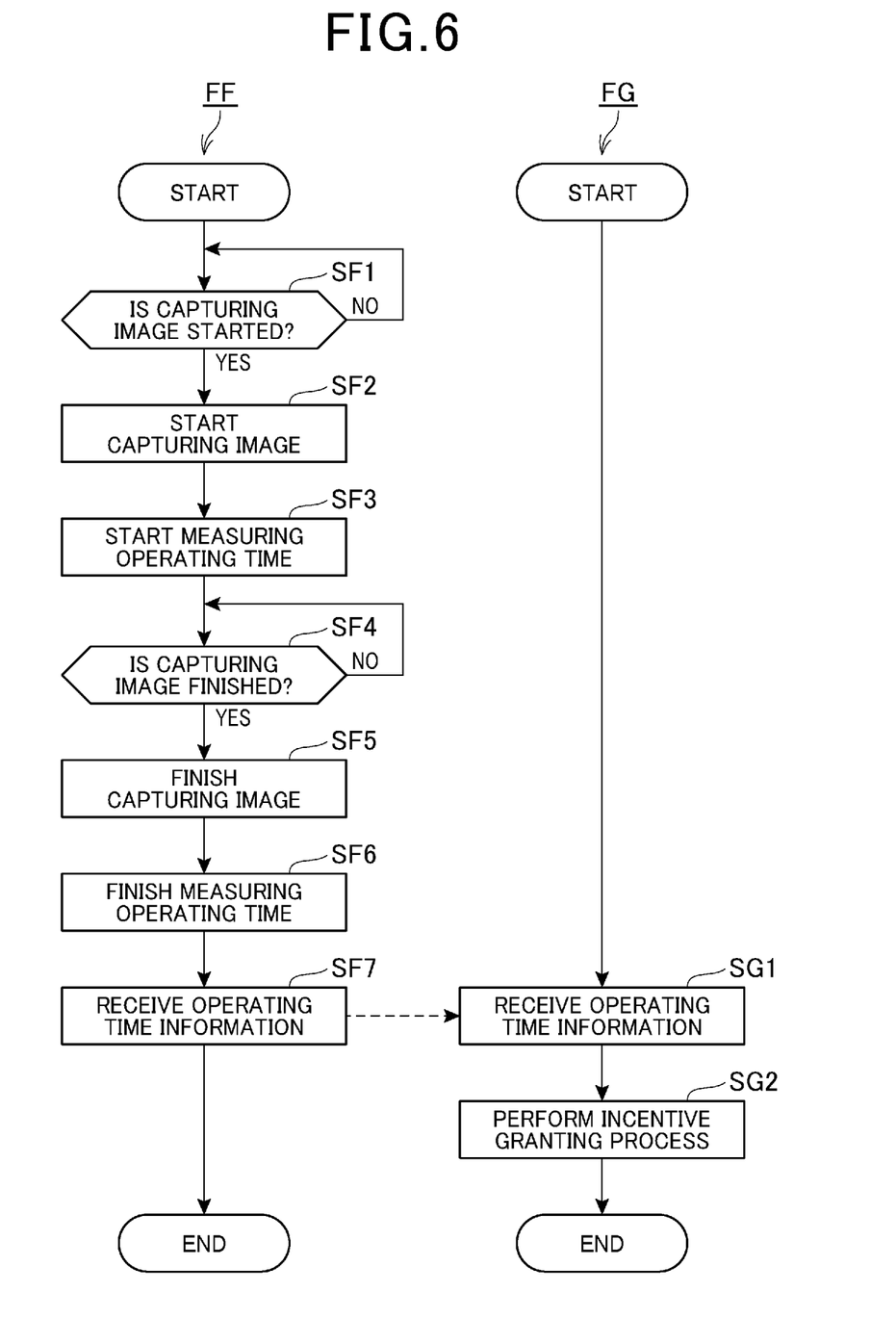
FIG. 6 is a flowchart showing an operation of the region monitoring system.

FIG. 6 is a flowchart showing an operation of the region monitoring system 1000. In FIG. 6, a flowchart FF shows an operation of the vehicle 2, and a flowchart FG shows an operation of the monitoring server 6.

As shown in the flowchart FF, the in-vehicle capturing control unit 211 of the vehicle 2 determines whether the in-vehicle camera 3 starts capturing an image (step SF1). For example, when the in-vehicle capturing control unit 211 receives an instruction from a passenger of the vehicle 2 to start capturing an image with the in-vehicle camera 3, affirmative determination is made in step SF1.

When it is determined that the in-vehicle camera 3 starts capturing an image (YES in step SF1), the in-vehicle capturing control unit 211 allows the in-vehicle camera 3 to start capturing an image (step SF2), and starts measuring the operating time of the in-vehicle camera 3 (step SF3).

Next, the in-vehicle capturing control unit 211 determines whether the in-vehicle camera 3 finishes capturing an image (step SF4). For example, when the in-vehicle capturing control unit 211 receives an instruction from the passenger of the vehicle 2 to finish capturing an image with the in-vehicle camera 3, affirmative determination is made in step SF4. Further, for example, when an ignition power supply or an accessory power supply of the vehicle 2 is turned off, the in-vehicle capturing control unit 211 makes an affirmative determination in step SF4.

When it is determined that the in-vehicle camera 3 finishes capturing an image (YES in step SF4), the in-vehicle capturing control unit 211 allows the in-vehicle camera 3 to finish capturing an image (step SF5), and finishes measuring the operating time of the in-vehicle camera 3 (step SF6).

Next, the first communication control unit 213 transmits operating time information indicating the operating time, which is measured by the in-vehicle capturing control unit 211, to the monitoring server 6 (step SF7).

The operating time information to be transmitted in step SF7 is associated with the user ID of the resident P who uses the vehicle 2. Such a user ID may be an ID that is stored in the in-vehicle memory 220, an ID that is acquired by communication of the in-vehicle device 200 with the resident terminal 7, or an ID that is input on the touch panel 230 by the resident P.

As shown in the flowchart FG, the server communication control unit 601 of the monitoring server 6 receives the operating time information from the vehicle 2 (step SG1).

Next, the incentive granting unit 603 performs an incentive granting process of granting an incentive based on the operating time information received in step SE1 (step SG2).

Step SG2 will be described in detail.

The incentive granting unit 603 calculates an operating time fee corresponding to the operating time indicated by the operating time information. The incentive granting unit 603 calculates the operating time fee based on an algorism in which the operating time fee increases as the operating time becomes longer. Next, the incentive granting unit 603 specifies a user ID that matches the user ID associated with the operating time information, from the user DB 612. Then, the incentive granting unit 603 changes the usage fee associated with the specified user ID to a usage fee obtained by reducing the calculated operating time fee.

In the case of the example of FIG. 1, the server communication control unit 601 of the monitoring server 6 receives operating time information from each of the vehicles 21 and 22. Then, the incentive granting unit 603 grants an incentive according to the operating time of the in-vehicle camera 31 to the resident P1. In addition, the incentive granting unit 603 grants an incentive according to the operating time of the in-vehicle camera 32 to the resident P2.

Next, a description will be given with respect to an operation when the monitoring server 6 provides information to the resident P.

Figure 7:
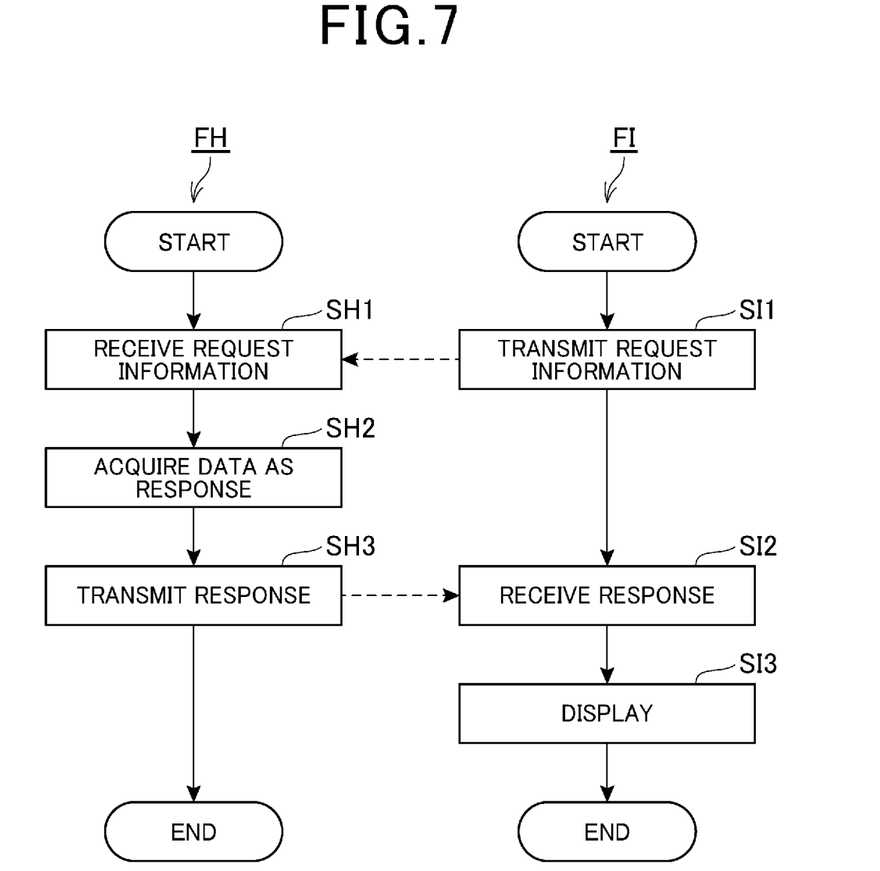
FIG. 7 is a flowchart showing an operation of the region monitoring system.

FIG. 7 is a flowchart showing an operation of the region monitoring system 1000.

In FIG. 7, a flowchart FH shows an operation of the monitoring server 6, and a flowchart FI shows an operation of the resident terminal 7.

As shown in the flowchart FI, the application execution unit 701 of the resident terminal 7 transmits request information to the monitoring server 6 (step SI1).

In step SI1, the application execution unit 701 transmits any request information of first request information, second request information, and third request information to the monitoring server 6.

The first request information is information used to request the monitoring camera captured-image data. The first request information may be information used to request the monitoring camera captured-image data of the specific monitoring camera 1. In this case, the first request information includes the monitoring camera ID 122 of the monitoring camera 1 that is a request target. The first request information may be monitoring camera captured-image data obtained around the position designated by the resident P. In this case, the first request information includes position information indicating the position designated by the resident P.

The second request information is information used to request the in-vehicle camera captured-image data. The second request information may be information used to request in-vehicle camera captured-image data obtained around the position designated by the resident P. In this case, the second request information includes position information indicting the position designated by the resident P.

The third request information is information used to request the image data of the stitching image. The third request information may be information used to request image data of a stitching image around the position designated by the resident P. In this case, the third request information includes position information indicating the position designated by the resident P.

As shown in the flowchart FH, the server communication control unit 601 of the monitoring server 6 receives the request information from the resident terminal 7 (step SH1).

Next, the server communication control unit 601 acquires data to be transmitted to the resident terminal 7 as a response of the received request information, from the database (step SH2).

In step SH2, when the request information received in step SH1 is the first request information, the server communication control unit 601 acquires the monitoring camera captured-image data from the monitoring camera captured-image DB 614. When the first request information includes the monitoring camera ID 112, the server communication control unit 601 acquires the monitoring camera captured-image data associated with the monitoring camera ID 112 from the monitoring camera captured-image DB 615. Further, when the first request information includes the position information of the position designated by the resident P, the server communication control unit 601 acquires monitoring camera captured-image data associated with position information indicating a position (for example, less than one meter) close to the position indicated by the position information, from the monitoring camera captured-image DB 614.

In step SH2, when the request information received in step SH1 is the second request information, the server communication control unit 601 acquires the in-vehicle camera captured-image data from the in-vehicle camera captured-image DB 615. When the second request information includes the position information of the position designated by the resident P, the server communication control unit 601 acquires in-vehicle camera captured-image data associated with position information indicating a position (for example, less than one meter) close to the position indicated by the position information, from the in-vehicle camera captured-image DB 615.

In step SH2, when the request information received in step SH1 is the third request information, the server communication control unit 601 acquires the image data of the stitching image from the stitching image DB 616. When the third request information includes the position information of the position designated by the resident P, the server communication control unit 601 acquires stitching data of a stitching image associated with position information indicating a position (for example, less than one meter) close to the position indicated by the position information, from the stitching image DB 616.

Next, the server communication control unit 601 transmits the data, which is acquired in step SH2, to the resident terminal 7, as a response of the request information (step SH3).

As shown in the flowchart FI, the application execution unit 701 of the resident terminal 7 receives the response of the request information (step SI2), and displays the data transmitted as the response on the touch panel 230 (step SI3).

In step SI3, when the first request information is transmitted in step SI1, the application execution unit 701 displays the monitoring camera captured-image indicated by the monitoring camera captured-image data received in step SI2.

In step SI3, when the second request information is transmitted in step SI1, the application execution unit 701 displays the in-vehicle camera captured-image indicated by the in-vehicle camera captured-image data received in step SI2.

In step SI3, when the third request information is transmitted in step SI1, the application execution unit 701 displays the stitching image indicated by the image data received in step SI2.

In the case of the example of FIG. 1, each of the resident terminals 71, 72, 73, 74, 75, 76, and 77 can receive data corresponding to kinds of the request information by transmitting the request information. Thereby, the monitoring server 6 can provide the monitoring camera captured-image data, the in-vehicle camera captured-image data, and the image data of the stitching image to each of the residents P1, P2, P3, P4, P5, P6, and P7.

4. Another Embodiment

The above-described embodiment exemplifies the region A in which seven houses H are present, but more houses H may be present in the region A monitored by the monitoring server 6, or the number of houses H may be less than seven.

The above-described embodiment exemplifies the region A in which six monitoring cameras 1 are installed, but more monitoring cameras 1 may be installed in the region A monitored by the monitoring server 6, or the number of monitoring cameras 1 to be installed may be less than six.

The above-described embodiment exemplifies the case where the residents p corresponding to the number of houses H reside in the region A, but the number of residents P in the region A may be larger or smaller than the number of houses H. In addition, all of the residents P may not use the resident terminal 7 in which the region monitoring application 711 is installed.

In the above-described embodiment, the monitoring camera 1 directly transmits the monitoring camera captured-image data to the monitoring server 6. In another embodiment, a collection device for collecting the monitoring camera captured-image data may transmit the monitoring camera captured-image data to the monitoring server 6. In such another embodiment, the monitoring camera 1 communicates with the collection device instead of the monitoring server 6, and the monitoring camera 1 transmits the monitoring camera captured-image data to the collection device. In such another embodiment, a functional unit communicating with the monitoring server 6 among the functional units of the collection device or the processor of the collection device corresponds to the first transmission unit.

FIGS. 2 and 3 are schematic diagrams in which the functional configurations of the monitoring camera 1, the vehicle 2, the monitoring server 6, and the resident terminal 7 are divided depending on the main processing contents, but the configuration of the monitoring camera 1, the vehicle 2, the monitoring server 6, and the resident terminal 7 is not limited. For example, the processing of the components of the server processor 600 may be executed by one hardware unit or a plurality of hardware units. The same applies to the camera processor 100, the in-vehicle processor 210, and the terminal processor 700. Each processing shown in FIGS. 4 to 7 may be executed by one program or a plurality of programs.

The control program 611 to be executed by the server processor 600 can also be implemented in a state where the control program 611 is recorded on a portable information recording medium. Examples of the information recording medium include a magnetic recording medium such as a hard disk, an optical recording medium such as a CD, and a semiconductor storage device such as a USB (Universal Serial Bus) memory or an SSD (Solid State Drive), but other recording media can also be used. This also applies to the control program 111 or 221, and the region monitoring application 711.

The units of operation shown in FIGS. 4 to 7 are divided according to the main processing contents in order to facilitate understanding of the operation of each of the units of the region monitoring system 1000, and are not limited by a manner of dividing the units of processing or names of the units of processing. The units of operation may be divided into more units of steps according to the processing contents. Division may be made such that one unit of a step includes further more processing. The order of the steps may be appropriately interchanged.

5. Configurations Supported by Embodiment Described Above

The above-described embodiment supports the following configurations.

(Configuration 1) A region monitoring system including: a first transmission unit that transmits first captured-image data to a monitoring device, the first captured-image data being captured-image data of a monitoring camera that monitors a region in which a plurality of houses are located; and a second transmission unit that transmits second captured-image data to the monitoring device, the second captured-image data being captured-image data of an in-vehicle camera of a vehicle located in the region.

According to the region monitoring system of Configuration 1, since a capturing range of the in-vehicle camera changes as the vehicle moves, the captured-image data outside the capturing range of the monitoring camera can be transmitted to the monitoring device. Further, it is possible to transmit captured-image data of a place, where the vehicle cannot move, to the monitoring device. Accordingly, according to the region monitoring system of Configuration 1, since the monitoring device can obtain captured-image data of a region captured in every corner, the region can be appropriately monitored using the camera.

(Configuration 2) In the region monitoring system according to Configuration 1, the region monitoring system further includes an incentive granting unit that grants an incentive according to an operating time of the in-vehicle camera to a driver of the vehicle.

According to the region monitoring system of Configuration 2, the incentive due to the capturing with the in-vehicle camera vehicle can be appropriately granted to the driver. Therefore, it is possible to increase a capturing motivation of the driver of the vehicle and to increase the number of captured-image data of the in-vehicle camera to be transmitted to the monitoring device. Accordingly, according to the region monitoring system of Configuration 2, the region can be monitored more appropriately using the camera.

(Configuration 3) In the region monitoring system according to Configuration 1 or 2, the second transmission unit starts operating a communication device of the vehicle when the second transmission unit transmits the second captured-image data, and transmits the second captured-image data to the monitoring device via the communication device being operated.

According to the region monitoring system of Configuration 3, since the communication device starts operating when the captured-image data of the in-vehicle camera is transmitted, it is possible to prevent the unnecessary operating of the communication device and reduce power consumption of the communication device.

(Configuration 4) In the region monitoring system according to any one of Configurations 1 to 3, the region monitoring system further includes a vehicle, the vehicle including: a transmission/reception unit that transmits and receives the second captured-image data to and from another vehicle which is located in the region; and a communication setting unit that sets the other vehicle as a target for the transmission/reception unit to transmit and receive the second captured-image data.

According to the region monitoring system of Configuration 4, the captured-image data of the in-vehicle camera can be shared between vehicles, and the region can be effectively monitored.

(Configuration 5) In the region monitoring system according to Configuration 4, the vehicle includes an authentication unit that performs authentication based on authentication information transmitted from the other vehicle, and the communication setting unit sets the other vehicle, which transmits the authentication information, as the target when the authentication unit determines authentication success.

According to the region monitoring system of Configuration 5, since the captured-image data of the in-vehicle camera can be transmitted to the vehicle of the authentication success, it is possible to limit the vehicle that can transmit and receive the captured-image data of the in-vehicle camera. Accordingly, it is possible to effectively monitor the region while preventing the captured-image data of the in-vehicle camera from being transmitted and received unnecessarily.

(Configuration 6) In the region monitoring system according to Configuration 5, when the transmission/reception unit sets, out of a plurality of the other vehicles between which the second captured-image data is capable of being transmitting and receiving, one of the plurality of the other vehicles as the target, the transmission/reception unit receives the second captured-image data from each of the plurality of the other vehicles.

According to the region monitoring system of Configuration 6, authentication with one vehicle is performed without performing authentication with many vehicles one by one, and the captured-image data of the in-vehicle camera can be received from many vehicles. Accordingly, it is possible to effectively monitor the region without any trouble.

(Configuration 7) In the region monitoring system according to any one of Configurations 1 to 5, the region monitoring system further includes an image generation unit that generates a three-dimensional stitching image in which a plurality images are stitched, based on a first captured image indicated by the first captured-image data transmitted by the first transmission unit and a second captured image indicated by the second captured-image data transmitted by the second transmission unit.

According to the region monitoring system of Configuration 7, the three-dimensional stitching image is generated, whereby an intuitively visible image of the region can be provided, and a subject such as a resident who is provided with the image can intuitively monitor the region.

(Configuration 8) A control method for a region monitoring system including: a first transmission step of transmitting captured-image data of a monitoring camera that monitors a region, in which a plurality of houses are located, to a monitoring device; and a second transmission step of transmitting captured-image data of an in-vehicle camera of a vehicle to the monitoring device, the vehicle being located in the region.

According to the control method for a region monitoring system of Configuration 8, it is possible to obtain the same operational effects as those of region monitoring system of Configuration 1.

REFERENCE SIGNS LIST 1, 11, 12, 13, 14, 15, 16 monitoring camera
2, 21, 22, 23, 24 vehicle
3, 31, 32, 33, 34 in-vehicle camera
4, 41, 42, 43, 44 TCU (communication device)
6 monitoring server (monitoring device)
25 other vehicle
102 camera communication control unit (first transmission unit)
213 first communication control unit (second transmission unit)
214 second communication control unit (transmission/reception unit)
215 authentication unit
216 communication setting unit
222 authentication information
602 image generation unit
603 incentive granting unit
1000 region monitoring system
A region
H, H1, H2, H3, H4, H5, H6, H7 house
P, P1, P2, P3, P4, P5, P6, P7 resident
P1, P2, P3, P4 driver

What is claimed is:

1. A region monitoring system that monitors a region in which a plurality of houses are located and in which a range of the region is set in advance, the region monitoring system comprising a monitoring server configured with a computer, the computer comprising a processor and a memory, the computer being communicatively connected to:
a monitoring camera installed in the region;
in-vehicle cameras mounted on each of a plurality of vehicles possessed by any one of a plurality of residents which reside in the region; and
a plurality of resident terminals used by each of the plurality of residents,
wherein the processor obtains
first captured-image data which is captured-image data of the monitoring camera; and
second captured-image data which is captured-image data of the in-vehicle cameras,
the processor stores the first captured-image data and the second captured-image data in a memory in association with position information indicating respective photographing positions of the captured-image data of the monitoring camera and the captured-image data of the in-vehicle cameras, and
when request information which is information for requesting captured-image data at a designated position is received from any one of the plurality of resident terminals, transmits, to the resident terminal from which the request information is received, the captured-imaqe data at the designated position that is at least one of the first captured-image data and the second captured-image data that is photographed at a distance less than a predetermined distance from the designated position.

2. The region monitoring system according to claim 1, wherein the processor grants an incentive according to an operating time of the in-vehicle cameras to the resident.

3. The region monitoring system according to claim 1, wherein the processor starts operating a communication device having a transmitter and a receiver of one of the plurality of vehicles when transmitting the second captured-image data, and transmits the second captured-image data via the communication device being operated.

4. The region monitoring system according to claim 1, wherein
authentication information that permits at least one of the plurality of vehicles as a target for the second captured-image data to be transmitted to and received is stored in the memory, and
the processor transmits the second captured-image data from a first vehicle, among the plurality of vehicles, to a second vehicle, among the plurality of vehicles, when authentication based on the authentication information is succeeded.

5. The region monitoring system according to claim 4, wherein when the processor sets, out of the plurality of vehicles between which the second captured-image data is capable of being transmitted and received, one of the plurality of vehicles as a second vehicle target, the processor receives the second captured-image data from each of a plurality of the first vehicle.

6. The region monitoring system according to claim 1, wherein the processor generates a three-dimensional stitching image in which a plurality of images are stitched, based on a first captured image indicated by the first captured-image data and a second captured image indicated by the second captured-image data, and transmits the three-dimensional stitching image to the resident terminal.

7. A control method for a region monitoring system that monitors a region in which a plurality of houses are located and in which a range of the region is set in advance, the control method comprising steps of:

obtaining first captured-image data that is captured-image data of a monitoring camera installed in the region, and second captured-image data that is captured-image data of in-vehicle cameras mounted on each of a plurality of vehicles possessed by any one of a plurality of residents which reside in the region;

storing the first captured-image data and the second captured-image data in a memory in association with position information indicating respective photographing positions of the captured-image data of the monitoring camera and the captured-image data of the in-vehicle cameras; and when request information which is information for requesting captured-image data at a designated position is received from any one of a plurality of resident terminals used by each of the plurality of residents which reside in the region, transmitting, to the resident terminal from which the request information is received, the captured-image data at the designated position that is at least one of the first captured-image data and the second captured-image data that is photographed at a distance less than a predetermined distance from the designated position.

* * * * *